United States Patent
Horng et al.

(10) Patent No.: US 7,050,273 B2
(45) Date of Patent: May 23, 2006

(54) BOTTOM SPIN VALVE SENSOR HAVING A LEAD OVERLAY (LOL) STRUCTURE FABRICATED THEREON

(75) Inventors: Cheng T. Horng, San Jose, CA (US); Mao-Min Chen, San Jose, CA (US); Chen-Jung Chien, Sunnyvale, CA (US); Cherng-Chyi Han, San Jose, CA (US); Ru-Ying Tong, San Jose, CA (US); Chyu-Jiuh Torng, Pleasanton, CA (US); Hui-Chuan Wang, Pleasanton, CA (US)

(73) Assignee: Headway Technologies, Inc., Milpitas, CA (US)

( * ) Notice: Subject to any disclaimer, the term of this patent is extended or adjusted under 35 U.S.C. 154(b) by 56 days.

(21) Appl. No.: 10/922,540

(22) Filed: Aug. 20, 2004

(65) Prior Publication Data

US 2005/0041339 A1  Feb. 24, 2005

Related U.S. Application Data

(62) Division of application No. 10/124,004, filed on Apr. 17, 2002, now Pat. No. 6,785,954.

(51) Int. Cl.
  *G11B 5/39* (2006.01)
(52) U.S. Cl. ............... 360/324.1; 360/322; 360/324.12
(58) Field of Classification Search ............... 360/322, 360/324.1, 324.12
See application file for complete search history.

(56) References Cited

U.S. PATENT DOCUMENTS

| 5,923,503 | A | 7/1999 | Sato et al. ............. 360/113 |
| 6,188,549 | B1 | 2/2001 | Wiitala ............. 360/320 |
| 6,208,491 | B1 | 3/2001 | Pinarbasi ............. 360/324.1 |
| 6,278,590 | B1 | 8/2001 | Gill et al. ............. 360/317 |
| 6,538,859 | B1 * | 3/2003 | Gill ............. 360/324.12 |
| 6,591,481 | B1 * | 7/2003 | Shimazawa et al. ..... 29/603.18 |
| 6,654,211 | B1 * | 11/2003 | Gill et al. ............. 360/324.12 |
| 6,756,135 | B1 * | 6/2004 | Hasegawa et al. ........ 428/811.5 |
| 6,773,515 | B1 * | 8/2004 | Li et al. ............. 148/240 |
| 2003/0167625 | A1 * | 9/2003 | Li et al. ............. 29/603.07 |
| 2004/0047082 | A1 * | 3/2004 | Han et al. ............. 360/324.1 |
| 2004/0252416 | A1 * | 12/2004 | Horng et al. ............. 360/324.1 |
| 2005/0024793 | A1 * | 2/2005 | Nakabayashi et al. . 360/324.11 |

* cited by examiner

*Primary Examiner*—Jefferson Evans
(74) *Attorney, Agent, or Firm*—George O. Saile; Stephen B. Ackerman

(57) ABSTRACT

A method for fabricating a longitudinally hard biased, bottom spin valve GMR sensor with a lead overlay (LOL) conducting lead configuration and a narrow effective trackwidth. The advantageous properties of the sensor are obtained by providing two novel barrier layers, one of which prevents oxidation of and Au diffusion into the free layer during annealing and etching and the other of which prevents oxidation of the capping layer during annealing so as to allow good electrical contact between the lead and the sensor stack.

18 Claims, 3 Drawing Sheets

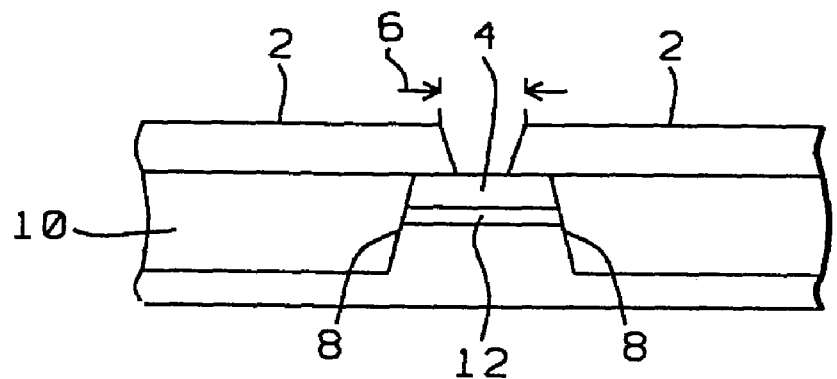
FIG. 1 – Prior Art
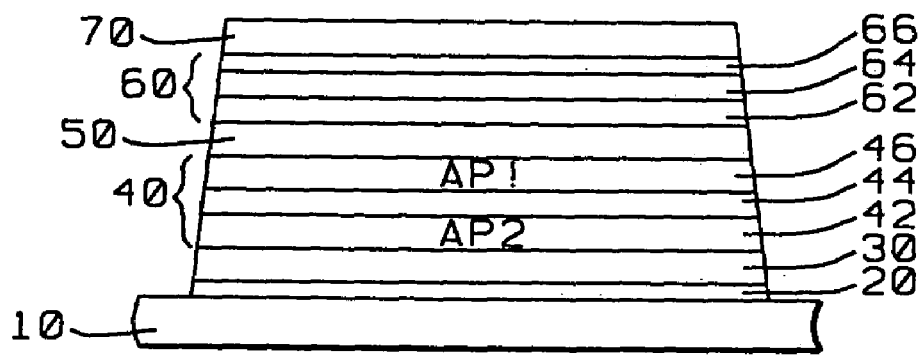
FIG. 2 – Prior Art

BOTTOM SPIN VALVE SENSOR HAVING A LEAD OVERLAY (LOL) STRUCTURE FABRICATED THEREON

This is a division of patent application Ser. No. 10/124,004, filing date Apr. 17, 2002, now U.S. Pat. No. 6,785,954, Structure And Process To Fabricate Led Overlay (Lol) On The Bottom Spin Valve, assigned to the same assignee as the present invention, which is herein incorporated by reference in its entirety.

RELATED PATENT APPLICATION

This application is related to Ser. No. (09/147,284), filing date (Dec. 26, 2000), assigned to the same assignee as the current invention.

BACKGROUND OF THE INVENTION

1. Field of the Invention

This invention relates generally to the fabrication of a giant magnetoresistive (GMR) magnetic field sensor of the bottom spin-valve (BSV) type and more specifically to methods for eliminating undesirable oxidations and diffusions during annealing and patterning when forming lead overlay (LOL) type lead layers.

2. Description of the Related Art

Magnetic read heads whose sensors make use of the giant magnetoresistive effect (GMR) in the bottom spin-valve configuration (BSV) are being increasingly required to read information recorded on magnetic media at ultra-high area densities (e.g. >45 Gb/in$^2$). To be capable of reading such area densities, the sensor must be able to resolve extremely high linear bit densities (BPI) and track densities (TPI), which, in turn, requires that it have an extremely narrow trackwidth and thin free layer to maintain high signal output. Unfortunately, narrow trackwidth designs tend to have reductions in both signal amplitude and sensor stability. A viable approach to obtaining high signal strength and narrow trackwidth is to use the lead overlay (LOL) design, wherein the physical trackwidth is defined by the longitudinal separation distance between the inner edges of the lead overlay while the contiguous junction longitudinal hard bias layers are placed beneath the leads and are separated by a greater longitudinal distance than the leads. FIG. 1 is a highly schematic diagram of a cross-sectional view of such a lead overlay configuration. The two separated lead segments (2) are formed over the sensor stack (4) and are separated longitudinally by a physical trackwidth (6). The actual contiguous junction edges (8) are contacted by the longitudinal hard (permanent magnetic) bias layers (10) which are seen to lie substantially beneath the lead layers. The bias layers contact the edges of the free layer (12) at the junction and pin its magnetization to improve sensor stability and eliminate thermally induced domain breakup. It is to be noted that there is an important difference between the physical trackwidth (6) which is defined by the physical placement of the lead edges and the effective or actual trackwidth of the sensor, the magnetic read width (MRW), which is the width that is responsible for the production of the bulk of the sensor signal. Since a portion of the sensor beneath the lead overlay is also capable of producing a signal ("side reading"), the effective trackwidth is typically greater than the physical trackwidth. One of the objects of sensor design is to reduce the effective trackwidth, which typically involves a corresponding reduction in physical trackwidth. In a very narrow sensor with a very narrow stack formation, the portion of the free layer pinned by the bias layer constitutes a dead zone as far as free layer response is concerned and so the strength of the bias layer may actually contribute to sensor instability rather than reduce it.

The standard prior art method of forming the LOL is to define the device regions (stack junctions and LOL edges) by lift-off photoresist patterning. To have the LOL perform optimally, good electrical contact between the LOL layer and the upper surface of the stack is a necessity. This requires extensive cleaning of the upper stack surface, which is typically achieved by an ion-beam etch (IBE) to remove oxide layers formed on the portions of the stack surface to be contacted (typically a Ta capping layer). The etching process is particularly critical when the stack is a bottom spin valve configuration, since that configuration has the free layer directly below the surface being etched. After the etching has been completed, the LOL layer, which is typically a Ta/Au/Ta tri-layer, is deposited. When very narrow physical trackwidths are being formed it is almost impossible to avoid shorting between the LOL edges.

The generic structure (i.e. prior art) of a bottom spin valve stack and LOL layer can be seen by referring to FIG. 2. This highly schematic cross-sectional view shows the essential stack layers in the following order, which may be considered as extending vertically upward from a substrate (10), wherein the longitudinal (or lateral) direction is from left-to-right and the transverse direction is perpendicular to the plane of the drawing. On the substrate (10) there is first seen a seed layer (20), which is typically a structure enhancing layer of NiCr. On the seed layer there is formed a pinning layer (30) of antiferromagnetic material, typically MnPt. On the pinning layer there is then formed a pinned layer (40), which, in this example, is a synthetic antiferromagnetic tri-layer comprising a lower ferromagnetic layer (designated AP2) (42) of CoFe, a coupling layer (44) of Ru and an upper ferromagnetic layer (designated AP1)(46) which is also a layer of CoFe. On the pinned layer is then formed a non-magnetic spacer layer (50), which is typically a layer of Cu. On the spacer layer is then formed a ferromagnetic free layer (60), which is here a tri-layer of CoFe (62), NiFe (64) and Cu (66). On the free layer is then formed a capping layer (70), typically a Ta layer approximately 10–20 angstroms thick, but ideally 5–10 angstroms thick. When this stack is exposed to an oxidizing ambient or to annealing to fix the magnetizations of the pinned and free layers, the capping layer (70) is oxidized to a depth of approximately 7 angstroms to form a 20 angstroms thick TaOx insulating layer which also serves as a specularly reflecting layer that greatly enhances sensor signal output. Pinarbasi (U.S. Pat. No. 6,208,491 B1) provides a stack structure similar to this in which a variety a capping layers are shown to improve the magnetoresistive coefficient (dr/R). Gill et al. (U.S. Pat. No. 6,278,590 B1) provides a bottom spin valve sensor, without a LOL configuration, that is incorporated within a merged read-write head. Sato et al. (U.S. Pat. No. 5,923,503) provides a spin valve sensor that is formed within an etched region of a longitudinal bias layer and conductive lead layer that have been formed on a non-magnetic substrate. Wiitala (U.S. Pat. No. 6,188,549 B1) provides high performance magnetic gap layers for use when incorporating spin valve read sensors within merged read/write configurations.

None of the above prior art references disclose a LOL configuration. If we return to the illustration of FIG. 2, the LOL layer (80) formed on the upper surface of the capping layer, is a tri-layer of Ta (82), Au (84) and Ta (86). The first Ta layer (82) serves as an adhesion layer for the Au and both the first and second (86) Ta layers diffuse into the Au layer during annealing to provide structural strength to the Au layer and help to eliminate lead smearing and electromigration.

If the configuration of FIG. 2 is to be capable of reading area densities exceeding 45 Gb/in$^2$, an effective trackwidth of approximately 0.2 microns is needed. This, in turn, requires a physical trackwidth of less than 0.15 microns. Such a narrow trackwidth is not well suited to be defined by an additive photoresistive lift-off process which adds new conductive material to an upper stack surface, but would be more advantageously formed by a subtractive etching process, such as a reactive ion etch (RIE), applied to remove material from an already formed conductive layer. It is the object of the present invention to provide such a novel lead overlay-bottom spin valve (LOL-BSV) structure in which a narrow physical trackwidth is obtained by RIE and in which other significant advantages are also obtained.

SUMMARY OF THE INVENTION

It is a first object of the present invention to provide a high signal output, magnetically stable, longitudinally hard biased bottom spin valve (BSV) GMR sensor capable of reading high area density magnetic recordings of densities exceeding 45 Gb/in $^2$ (gigabits per square inch).

It is a second object of the present invention to provide such a BSV GMR sensor having a LOL configuration that is structurally stable and resistant to smearing and electromigration.

It is a third object of the present invention to provide such a LOL configured sensor with improved electrical contact between the lead layer and capping layer.

It is a fourth object of the present invention to provide such a BSV GMR sensor wherein the entire sensor stack and a portion of the lead overlay is formed in a single deposition process.

The objects of the present invention will be achieved by the use of a novel LOL layer in conjunction with a novel barrier layer and capping layer and is described briefly with reference to FIGS. 3a and 3b as follows. The capping layer consists of a usual 20–30 angstroms Ta capping layer (70) over which a novel Au layer (75) 100 angstroms thick is deposited in situ. The Au/Ta layer has been deposited over a novel Ru barrier layer (69), which will protect the free layer (60) beneath it from Au interdiffusion during processing. A further advantage of the Ta layer (70) is that it can be grown in a low resistance phase.

Subsequent to stack patterning but prior to the formation of a longitudinal hard bias layer (110) of FIG. 3b, the sensor stack is given a first pinned layer anneal, wherein the Au layer protects the Ta layer from oxidation. A Ta (125 angstroms)/Au (350 angstroms) LOL layer (100) is then deposited as a blanket layer over the (unoxidized) Ta capping layer (70). A narrow physical trackwidth of width less than 0.15 microns is then formed through said LOL layer by applying a two-step reactive ion etch (RIE), wherein the first step consists of application of a $CF_4$ RIE through a photoresist pattern to remove the 125 angstrom upper portion of the Ta layer, whereupon a second step consists of using the now patterned Ta layer as a mask for an $Ar/O_2$ plasma RIE etch. An additional advantage of the $Ar/O_2$ plasma etch is that the $O_2$ component oxidizes the upper Ta portion of the LOL to form a specularly reflecting layer that enhances the signal strength produced by the sensor. The unoxidized Ta layer of the capping layer provides electrical contact between the LOL and the sensor stack. The sensor so fabricated has an effective magnetic trackwidth of approximately 0.2 microns.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying figures, wherein:

FIG. 1 is a schematic drawing of a prior art LOL BSV sensor configuration.

FIG. 2 is a schematic drawing of a prior art BSV sensor stack configuration.

DESCRIPTION OF THE PREFERRED EMBODIMENT

Figure 3A:
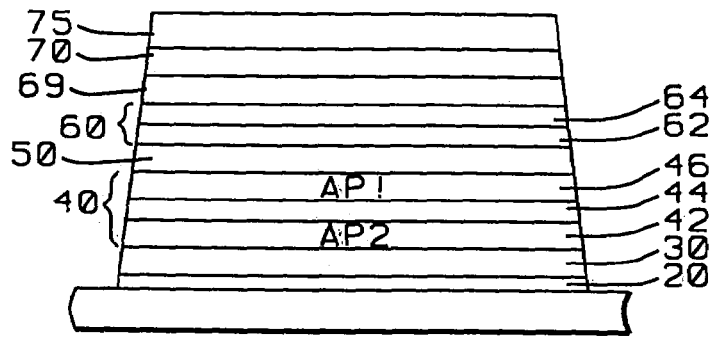
FIG. 3a is a schematic drawing of a sensor stack formed in accord with the present invention.

Referring first to FIG. 3a there is shown a schematic cross-sectional view through an ABS plane of a bottom spin valve (BSV) GMR sensor stack subsequent to a first annealing process but before the formation of a contiguous longitudinal hard bias layer and blanket LOL layer. The stack is formed in accord with the preferred embodiment of the present invention.

Moving vertically upward in the stack structure, on the substrate (10) there is first seen a seed layer (20), which is typically a structure enhancing layer of NiCr and which is typically formed to a thickness of between approximately 50 and 65 angstroms, with approximately 60 angstroms being preferred. On the seed layer there is then formed a pinning layer (30) of antiferromagnetic material, typically MnPt, formed to a thickness of between approximately 100 and 150 angstroms, with approximately 120 angstroms being preferred. On the pinning layer there is then formed a pinned layer (40), which, in this embodiment, is a synthetic antiferromagnetic tri-layer comprising a lower ferromagnetic layer (designated AP2) (42) of CoFe, formed to a thickness of between approximately 15 and 20 angstroms, with approximately 15 angstroms being preferred, a coupling layer (44) of Ru formed on AP2 to a thickness of between approximately 7 and 8 angstroms, with approximately 7.5 angstroms being preferred, and an upper ferromagnetic layer (designated AP1) (46) formed on the coupling layer, which upper layer is also a layer of CoFe, formed to a thickness of between approximately 20 and 25 angstroms with approximately 20 angstroms being preferred. On the pinned layer is then formed a non-magnetic spacer layer (50), which is typically a layer of Cu formed to a thickness of between approximately 16 and 25 angstroms with approximately 18 angstroms being preferred. On the spacer layer is then formed a ferromagnetic free layer (60), which is here a bilayer of CoFe (62) and NiFe (64), wherein the CoFe layer is between approximately 5 and 15 angstroms with approximately 10 angstroms being preferred and the NiFe layer is between approximately 15 and 30 angstroms with approximately 20 angstroms being preferred. On the free layer is then formed a barrier layer (69), which is a layer of Ru formed to a thickness of between approximately 5 and 15 angstroms, with approximately 10 angstroms being preferred. On the Ru barrier layer is then formed a capping bilayer, the lower layer of which is a Ta capping and adhesion layer (70), said layer being formed in a low resistance phase and to a thickness of between approximately 10 and 40 angstroms, with approximately 30 angstroms being preferred. On this Ta capping and adhesion layer is then formed an upper capping layer, which is an Au capping layer (75), said layer being formed to a thickness of between approximately 75 and 150 angstroms, with approximately 100 angstroms being preferred and said layer completing the GMR stack. The entire GMR stack thus formed is formed in the GMR sputtering system in a single pump-down. The Au capping layer (75) protects the Ta capping and adhesion (70) layer from oxidation during the subsequent pinned layer (40) annealing process to magnetize the pinned layer (said magnetization shown in FIG. 3*b* as (80) and (81)).

Figure 3B:
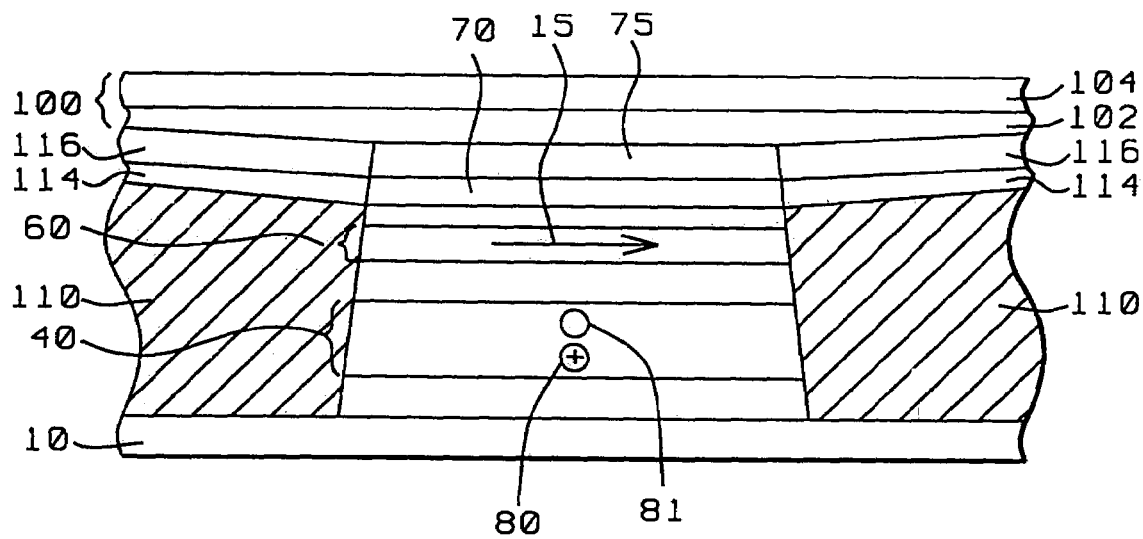
FIG. 3b is a schematic drawing showing the stack of FIG. 3a now having formed on it a longitudinal bias layer and LOL configuration in accord with the present invention, but prior to trackwidth formation.

Referring next to FIG. 3*b*, there is shown, schematically, the stack of FIG. 3*a* subsequent to a pinned layer annealing in a transverse 10 kOe field at 280° C. for 5 hours to set the pinned layer magnetization. A circle (81) and a circle and cross (80) indicate the transverse magnetizations of the pinned layer (40). A contiguous longitudinal hard bias layer (110) is now formed contacting the stack edges, said layer being a layer of CoPtCr formed to a thickness of between approximately 200 and 400 angstroms, with 300 angstroms being preferred. The CoPtCr layer is then capped with a second capping layer, which is a bilayer comprising a lower layer of Ta (114) on which is formed an upper layer of Au (116), said Ta layer being formed to a thickness of approximately 20 angstroms and said Au layer being formed to a thickness of approximately 100 angstroms. It is to be noted that two novel protective layers have thus far been formed. The barrier layer ((69) in FIG. 3*a*), to protect the free layer from oxidation and diffusion during annealing and subsequent etching (discussed below) and the first Au capping layer (75) to protect the first Ta capping layer from oxidation during annealing. For example, GMR annealing in a transverse 10 kOe field at 280° C. for 5 hours to set the pinned layer magnetization has been shown to produce a severe degradation of a free layer capped only with Cu, indicating diffusion of Au through the Ta/Cu layer into the free layer. The presence of a Ru barrier layer, such as layer (69) in FIG. 3*a*, of at least 5 angstroms in thickness eliminates this degradation.

A blanket LOL layer (100) is now formed over the upper capping layer (75) on the GMR stack and the upper capping layer (116) on the longitudinal bias layer, the LOL layer being formed as a bilayer comprising an Au layer (102) of thickness between approximately 250 and 400 angstroms with approximately 350 angstroms being preferred, on which is formed a Ta layer (104) of thickness between approximately 100 and 150 angstroms, with 125 angstroms being preferred. At this point the fabrication is subjected to a second annealing process to set the longitudinal magnetization (15) of the free layer (60). Subsequent to the formation of the physical trackwidth as specified above, the sensor formation is subjected to a second anneal to set the magnetization of the free layer (60) in the longitudinal direction, shown by the arrow (15). The second anneal is carried out in a longitudinal magnetic field of approximately 250 Oe, at a temperature of approximately 250° C. and for a time of approximately 1 hour.

Figure 4A:
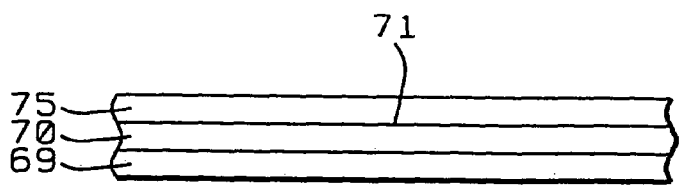
FIGS. 4a–d are a series of schematic drawings illustrating the steps whereby the physical trackwidth is formed in the LOL configuration.

FIGS. 4*a*–*d* show, schematically, a limited portion of the sensor formation of FIGS. 3*a* and 3*b*. The purpose of these figures is to show more clearly the process by which the physical trackwidth is formed. Referring first to FIG. 4*a*, there is shown a central portion of the upper three stack layers before formation of the LOL layer and after annealing of the stack to set the magnetization of the pinned layer. The longitudinal hard bias layer is not shown in this view. All dimensions are as indicated in FIG. 3*a*. The Ru barrier layer (69), the Ta capping and adhesion layer (70) and the Au protective layer (75) are shown. The upper surface (71) of the Ta layer has not been oxidized by the annealing process, which will allow a good electrical contact between the subsequently deposited LOL layer and the stack.

Figure 4B:
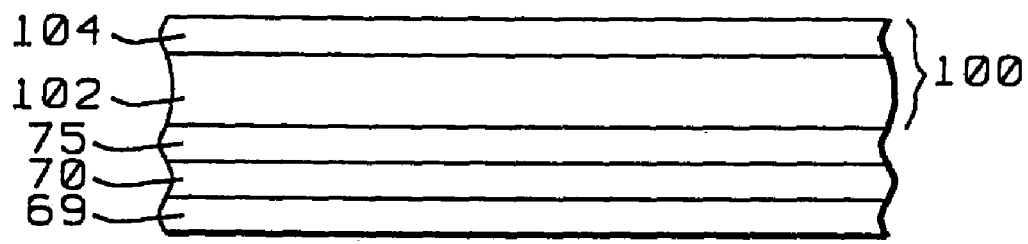

Referring next to FIG. 4*b*, there is shown the structure of FIG. 4*a*, on which has now been formed the blanket LOL layer (100) (described more fully and with dimensions in the discussion above accompanying FIG. 3*b*), comprising an Au layer (102) and a Ta layer (104). It is understood that the LOL layer extends longitudinally to both sides so as to also cover the capped longitudinal bias layer, which is not shown here.

Figure 4C:
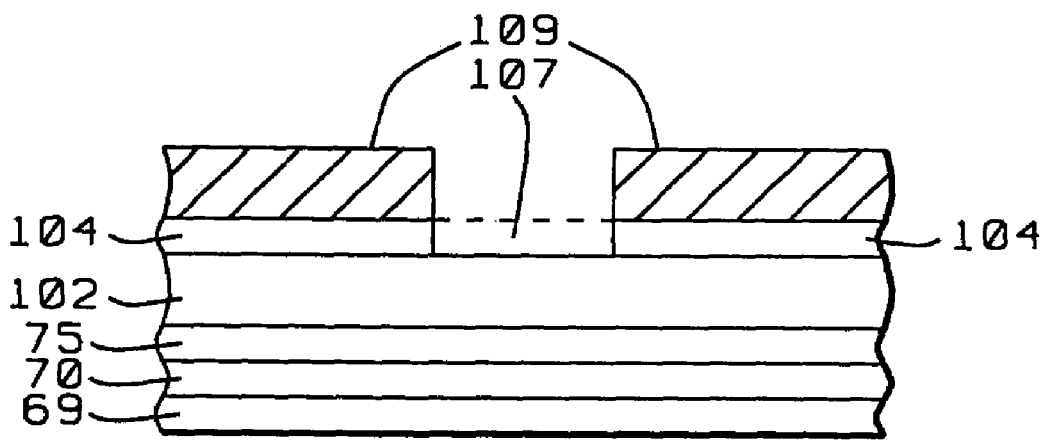

Referring next to FIG. 4*c*, there is shown the Ta layer (104) with a portion in dashed outline (107) having been etched away by a $CF_4$ reactive ion etch applied through a mask formed from an etch-resistant coating (109), such as a photoresist coating. The removed portion of the Ta layer consequently has the width of the desired physical trackwidth.

Figure 4D:
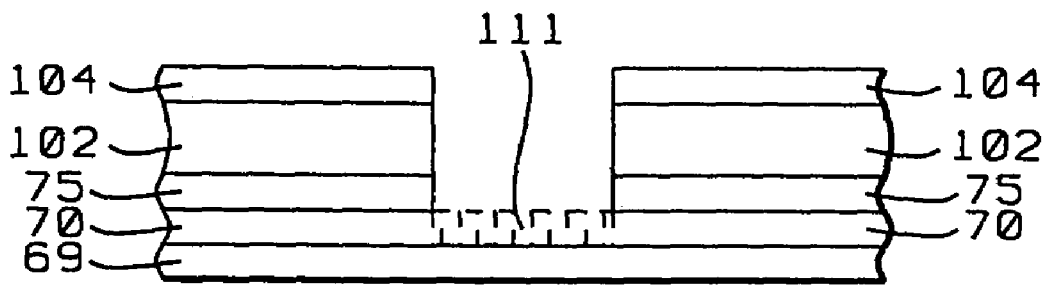

Referring next to FIG. 4*d*, there is shown the results of a second etch, this etch being performed using an $Ar/O_2$ plasma reactive ion etch, now using the already etched and cleansed Ta layer (104) as an etch mask. The etch rate selectivity ratio of the etchant among the group Au:Ru:Ta is approximately 30:4:1, so the Au layer (102) is completely removed and the Ta capping layer (70) beneath it, which serves as a first etching barrier, is also partially removed and partially oxidized, the oxidized region (111) being shown as shaded. The Ru layer (69) serves as a second etching barrier and oxidation barrier to protect the free layer from oxidation by this process. As a result of the etching process, the oxidized Ta layer (70) beneath the LOL layer serves as a specular reflecting layer to enhance the GMR ratio (dr/R) and improve overall signal performance of the sensor.

As is understood by a person skilled in the art, the preferred embodiment of the present invention is illustrative of the present invention rather than limiting of the present invention. Revisions and modifications may be made to methods, materials, structures and dimensions employed in fabricating a longitudinally hard biased bottom spin valve GMR sensor with a novel LOL configuration and capping layer structure and a narrow effective trackwidth together with the sensor so fabricated, while still providing a method for fabricating such a longitudinally hard biased bottom spin valve GMR sensor with a novel LOL configuration and capping layer structure and a narrow effective trackwidth together with the sensor so fabricated, in accord with the spirit and scope of the present invention as defined by the appended claims.

What is claimed is:

1. A longitudinally biased bottom spin valve GMR read sensor having a lead overlay configuration and narrow trackwidth comprising:

a substrate;

a bottom spin valve stack formed on the substrate, said stack having a barrier layer capped by a bilayer formed of an upper layer and a lower layer and said stack being bounded laterally by edges;

a longitudinal bias layer of permanent magnetic material (hard bias layer) formed contiguous to said stack edges;

a second capping layer formed on said bias layer;

a blanket conducting lead overlay layer (LOL) formed over said stack and bias layer;

an opening formed within a central portion of said lead overlay layer (LOL), the lateral extension of said opening defining a physical trackwidth and the opening extending vertically through the LOL and the upper layer of the capping bilayer and reaching at least to the upper surface of the lower layer of said capping bilayer but not reaching its lower surface and the remaining thickness of said lower layer being oxidized thereby to form a specularly reflecting layer; and the sensor so formed having its pinned layer transversely magnetized and its free layer and its bias layer longitudinally magnetized.

2. The sensor of claim 1 wherein the LOL conducting layer is a bilayer comprising an Au layer on which is formed a Ta layer.

3. The sensor of claim 2 wherein the Au layer is formed to a thickness of between approximately 250 and 450 angstroms and where the Ta layer is formed to a thickness of between approximately 100 and 150 angstroms.

4. The sensor of claim 2 wherein said stack formation comprises:

a seed layer;

an antiferromagnetic pinning layer formed on said seed layer;

a synthetic antiferromagnetic pinned layer formed on said pinning layer;

a non-magnetic spacer layer formed on said pinned layer;

a ferromagnetic free layer formed on said spacer layer;

a barrier layer formed on said free layer;

a capping bilayer formed on said barrier layer, said bilayer having an upper layer and a lower layer.

5. The sensor of claim 4 wherein the Au layer protects the Ta layer from oxidation during sensor annealing processes.

6. The sensor of claim 4 wherein the layer of Ta is formed to a thickness of between approximately 20 and 40 angstroms and wherein the Au layer is formed to a thickness of between approximately 75 and 150 angstroms.

7. The sensor of claim 4 wherein the free layer is a bilayer comprising a layer of CoFe, on which is formed a layer of NiFe.

8. The sensor of claim 7 wherein the CoFe layer is formed to a thickness of between approximately 5 and 15 angstroms and the NiFe layer is formed to a thickness of between approximately 15 and 25 angstroms.

9. The sensor of claim 4 wherein the synthetic antiferromagnetic pinned layer further comprises:

a first ferromagnetic layer;

a non-magnetic antiferromagnetically coupling layer formed on said first ferromagnetic layer;

a second ferromagnetic layer formed on said coupling layer.

10. The sensor of claim 9 wherein the first ferromagnetic layer is a layer of CoFe formed to a thickness of between approximately 13 and 20 angstroms and the second ferromagnetic layer is a layer of CoFe formed to a thickness of between approximately 15 and 25 angstroms.

11. The sensor of claim 9 wherein the non-magnetic antiferromagnetically coupling layer is a layer of Ru formed to a thickness of between approximately 7 and 8 angstroms.

12. The sensor of claim 4 wherein the non-magnetic spacer layer is a layer of Cu formed to a thickness of between approximately 16 and 20 angstroms.

13. The sensor of claim 2 wherein the bias layer is a layer of CoPtCr formed to a thickness of between approximately 200 and 400 angstroms.

14. The sensor of claim 2 wherein the second capping layer is a bilayer comprising a layer of Ta formed to a thickness of between approximately 10 and 30 angstroms on which is formed a layer of Au formed to a thickness of between approximately 100 and 150 angstroms.

15. The sensor of claim 1 wherein the first capping layer is a bilayer comprising a layer of Ta on which is formed a layer of Au.

16. The sensor of claim 15 wherein the barrier layer protects the free layer from Au diffusion during sensor annealing processes and oxidation during sensor annealing processes and etching processes.

17. The sensor of claim 16 wherein the barrier layer is a layer of Ru formed to a thickness of between approximately 5 and 15 angstroms.

18. The sensor of claim 1 wherein the opening within the LOL layer is between approximately 0.1 and 0.2 microns.

* * * * *